(12) United States Patent
Chi et al.

(10) Patent No.: US 11,500,418 B2
(45) Date of Patent: Nov. 15, 2022

(54) HEAD-MOUNTED DISPLAY DEVICE

(71) Applicant: GOERTEK INC., Shandong (CN)

(72) Inventors: Xiaocheng Chi, Shandong (CN);
Yuanjing Zheng, Shandong (CN);
Dong Liang, Shandong (CN)

(73) Assignee: GOERTEK INC., Shandong (CN)

( * ) Notice: Subject to any disclaimer, the term of this patent is extended or adjusted under 35 U.S.C. 154(b) by 0 days.

(21) Appl. No.: 17/267,862

(22) PCT Filed: Dec. 28, 2018

(86) PCT No.: PCT/CN2018/124599
§ 371 (c)(1),
(2) Date: Feb. 11, 2021

(87) PCT Pub. No.: WO2020/062682
PCT Pub. Date: Apr. 2, 2020

(65) Prior Publication Data
US 2021/0303025 A1    Sep. 30, 2021

(30) Foreign Application Priority Data
Sep. 28, 2018    (CN) .......................... 201811139880.5

(51) Int. Cl.
*G06F 1/16*     (2006.01)
*G06F 1/18*     (2006.01)
*G02B 27/01*    (2006.01)

(52) U.S. Cl.
CPC ......... *G06F 1/163* (2013.01); *G02B 27/0176* (2013.01); *G06F 1/182* (2013.01)

(58) Field of Classification Search
CPC ......... G06F 1/163; G06F 1/182; G02B 27/01; G02B 27/0176
See application file for complete search history.

(56) References Cited

U.S. PATENT DOCUMENTS 9,989,998 B1    6/2018  Yee
10,444,800 B2 * 10/2019 Sullivan ................ G06F 1/1656
10,764,566 B2 *  9/2020 Sullivan ............... G06Q 20/321

FOREIGN PATENT DOCUMENTS

CN     105182533 A    12/2015
CN     205750118 U    11/2016
(Continued)

OTHER PUBLICATIONS

International Search Report, English Translation, dated Jun. 20, 2019, for PCT/CN2018/124599, filed Dec. 28, 2018.

*Primary Examiner* — Sardis F Azongha
(74) *Attorney, Agent, or Firm* — Workman Nydegger (57) ABSTRACT

Disclosed is a head-mounted display device, including a main body portion with an ocular lens, and further including an adjustment assembly which is connected to the main body portion and is used for adjusting a positional relationship with respect to the main body portion, wherein the adjustment assembly includes a shielding portion; when the adjustment assembly is in a first operating state, the shielding portion is away from the main body portion for realizing a wearing function; and when the adjustment assembly is in a second operating state, the shielding portion is close to the main body portion for shielding the ocular lens, thereby realizing convenient and quick storage and safekeeping, and facilitating the prolonging of the service life of the head-mounted display device.

19 Claims, 10 Drawing Sheets

(56) References Cited

FOREIGN PATENT DOCUMENTS

| CN | 106773066 A | | 5/2017 | |
|---|---|---|---|---|
| CN | 106842574 A | | 6/2017 | |
| CN | 107632399 A | | 1/2018 | |
| CN | 108508610 A | | 9/2018 | |
| CN | 207833110 U | | 9/2018 | |
| CN | 208239727 U | | 12/2018 | |
| CN | 208459691 U | * | 2/2019 | ......... G02B 27/0172 |
| CN | 110727114 A | * | 1/2020 | ............. G02B 27/01 |

* cited by examiner

HEAD-MOUNTED DISPLAY DEVICE

This application is a national phase of International Application No. PCT/CN2018/124599, titled "HEAD-MOUNTED DISPLAY DEVICE", filed on Dec. 28, 2018, which claims the priority to Chinese patent application No. 201811139880.5, titled "HEAD-MOUNTED DISPLAY DEVICE", filed with the China National Intellectual Property Administration on Sep. 28, 2018, both of which applications are incorporated herein in their entireties by this reference.

FIELD

The present application relates to the technical field of wearable devices, and more particularly to a head-mounted display device.

BACKGROUND

With the continuous development of VR (virtual reality) and AR (augmented reality) technologies, various VR/AR head-mounted display devices have been put on market one after another.

In order to improve the user experience, the quality of the main body with eyepieces has become an important indicator of the user experience. In the prior art, in order to fix the head-mounted display device on the head of the user, the head-mounted display device generally includes a main body and head-wearing components such as straps. As the internal components of the main body become more complex and precise, the head-mounted display device is generally cumbersome, and after the user finishes using it, the head-mounted display device occupies a large space and is not convenient for storage and collection. Besides, after the user finishes using it, external light can easily cause burns to the display screen inside the main body.

In summary, a problem worthy of consideration by those skilled in the art is how to store the head-mounted display device in a convenient and fast way.

SUMMARY

An object of the present application is to provide a head-mounted display device, which can achieve convenient and fast storage and helps to improve the service life of the head-mounted display device.

In order to achieve the above object, the head-mounted display device according to the present application includes a main body with eyepieces and an adjustment assembly with a shielding portion. The adjustment assembly is connected to the main body, and the adjustment assembly is configured to adjust a positional relationship between the shielding portion and the main body.

In a case that the adjustment assembly is in a first working state, the shielding portion is far away from the main body to achieve the head-wearing function.

In the case that the adjustment assembly is in a second working state, the shielding portion is close to the main body to prevent light from irradiating the eyepieces.

Preferably, the adjustment assembly further includes a deformable connecting portion configured to connect the main body with the shielding portion.

Preferably, the adjustment assembly further includes a connecting rod group configured to connect the main body with the shielding portion.

Preferably, two ends of the connecting rod group are respectively hinged to the main body and the shielding portion, and the connecting rod group includes at least two connecting rods, and two adjacent connecting rods are hinged to each other.

Preferably, one of the mutually articulated pair, that is, the pair of the connecting rod group and the main body, the pair of the connecting rod group and the shielding portion, and the pair of the two adjacent connecting rods, is provided with an extension arm, and the other of the mutually articulated pair is provided with a receiving groove configured to receive the extension arm and position-limiting holes penetrating through two sides of the receiving groove. The extension arm is provided with a through hole penetrating through two sides of the extension arm.

The head-mounted display device further includes a rotating shaft configured to penetrate through the through hole and the two position-limiting holes, and a fastening portion is configured to lock with the rotating shaft, so as to fix two ends of the rotating shaft relative to the two position-limiting holes.

Preferably, all the connecting rods are arc-shaped rods; and/or, the shielding portion is arc-shaped.

Preferably, the head-mounted display device further includes a damping component sleeved on the rotating shaft and configured to abut against a set of adjacent side walls of the extension arm and the receiving groove.

Preferably, a position-limiting structure is provided between two fitting side walls of the extension arm and the receiving groove, the position-limiting structure and the damping component are respectively located on two sides of the receiving groove, and the position-limiting structure is configured to keep the extension arm and the receiving groove at the current position after the extension arm and the receiving groove are rotated relative to each other.

Preferably, the shielding portion is provided with an energy supply component configured to provide electric energy to the main body.

Preferably, the head-mounted display device further includes elastic wearing portions arranged between the main body and the shielding portion and configured to be tightened on two sides of the head.

Preferably, an adjusting device is further provided between the main body and each elastic wearing portion, and the adjusting device is configured to adjust a distance between the elastic wearing portion and the main body.

Preferably, the adjusting device includes a body portion provided on the main body, and further includes a sliding rail provided on the body portion and configured to move away from or close to the main body. The sliding rail is connected with the elastic wearing portion.

With respect to the above background technology, in the head-mounted display device according to the present application, the adjustment assembly is connected with the main body, and the positional relationship between the adjustment assembly and the main body is adjustable. The adjustment assembly includes the shielding portion, which means that, when the positional relationship between the adjustment assembly and the main body changes, the positional relationship between the shielding portion and the main body changes accordingly. To be specific, in a case that the adjustment assembly is in the first working state, the shielding portion is far away from the main body, and the shielding portion is configured to achieve head wearing; in a case that the adjustment assembly is in the second working state, the shielding portion is close to the main body, and the shielding portion is configured to prevent light from irradiating the eyepieces of the main body. In short, when the adjustment assembly is in the above different states, the positional relationships of the adjustment assembly with respect to the main body are different, so that the shielding portion has different functions, that is, head wearing and light shielding. In other words, by changing the positional relationship of the adjustment assembly with respect to the main body, the adjustment assembly can be in different working states, that is, two different functions of the shielding portion can be realized. While the shielding portion satisfies the head-wearing function in the conventional technology, by changing the positional relationship of the adjustment assembly with respect to the main body, the shielding portion is further provided with the function of light shielding and preventing burns to the display screen located inside the main body caused by irradiation of light on the eyepieces. With this arrangement, after the user has finished using it, by changing the positional relationship of the adjustment assembly with respect to the main body, the shielding portion can block the light, so as to avoid burns to the internal components of the main body due to irradiation of the light on the main body. Therefore, the head-mounted display device can be stored conveniently and quickly, which avoids the reduction of the service life of the head-mounted display device to a certain extent.

BRIEF DESCRIPTION OF THE DRAWINGS

For more clearly illustrating embodiments of the present application or technical solutions in the conventional technology, the drawing referred to for describing the embodiments or the conventional technology will be briefly described hereinafter. Apparently, the drawings in the following description are only examples of the present application, and for those skilled in the art, other drawings may be obtained based on the provided drawings without any creative efforts.

DETAILED DESCRIPTION OF THE EMBODIMENTS

The technical solutions according to the embodiments of the present application will be described clearly and completely as follows in conjunction with the drawings in the embodiments of the present application. It is apparent that the described embodiments are only a part of the embodiments according to the present application, rather than all the embodiments. Based on the embodiments of the present application, all of other embodiments, made by those skilled in the art without any creative efforts, fall into the scope of the present application.

In order to provide the person skilled in the art with a better understanding of the solution of the present application, the present application is described hereinafter in further detail in conjunction with the drawings and embodiments.

Figure 1:
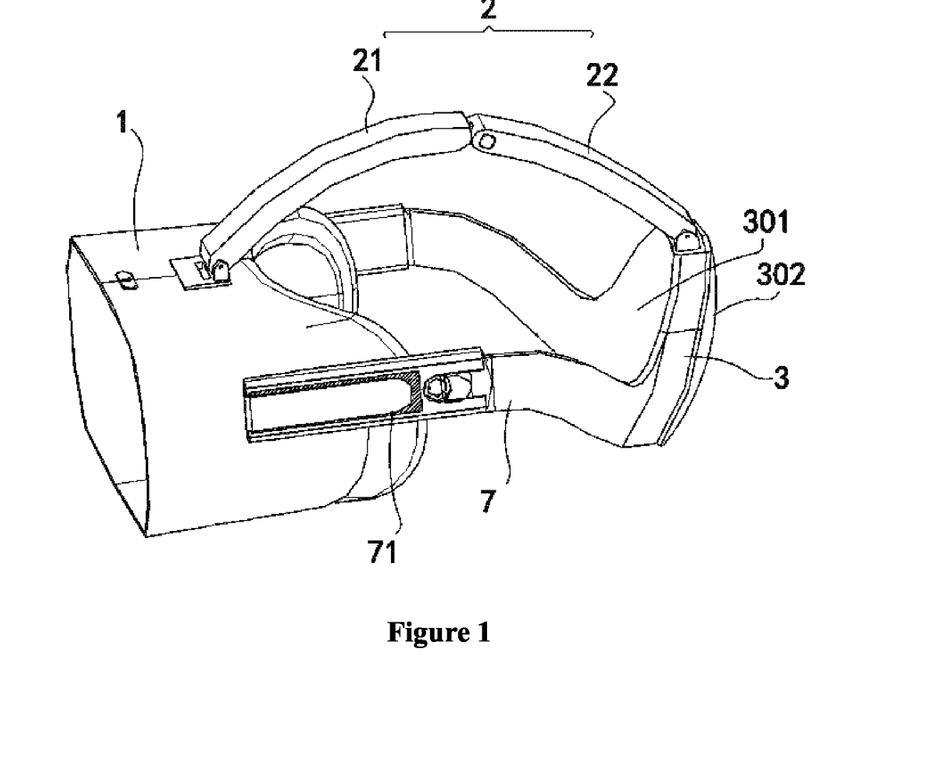
FIG. 1 is a schematic view showing the overall structure of a head-mounted display device according to an embodiment of the present application.

A head-mounted display device is provided according to the present application, which mainly includes a main body 1 and an adjustment assembly, and the adjustment assembly includes a shielding portion 3, as shown in FIG. 1.

The main body 1 is provided with eyepieces, and the eyepieces generally include at least one lens. When the display device is in use, the main body 1 is in front of the user's eyes, and the user views the image on a display screen located inside the main body 1 through the lens. When the display device is not in use, if the main body 1 is placed in a bright space, due to the principle of reversibility of the light path, external light is easily focused on the display screen through the lens, which easily causes burns to the display screen.

The main body 1 is connected to the adjustment assembly, and the positional relationship of the adjustment assembly relative to the main body 1 is adjustable. The adjustment assembly has two working positions relative to the main body 1. The two working positions respectively correspond to two working states of the adjustment assembly, that is, a first working state and a second working state.

FIG. 1 shows a situation in which the adjustment assembly is in the first working state. In this case, the overall adjustment assembly is in a stretched state, and the shielding portion 3 is far away from the main body 1. That is, when the head-mounted display device is in use, the main body 1 is located in front of the human eyes, and the shielding portion 3 abuts against the back of the head. At this time, the head-mounted display device can be worn on the human head to achieve the function of the head-mounted display device.

In a case that the adjustment assembly is in the first working state, the adjustment assembly is connected to the main body 1, the shielding portion 3 is far away from the main body 1, and the shielding portion 3 is connected with the main body 1. At this time, the shielding portion 3 abuts against the back of the head, the main body 1 is located in front of the human eyes, and an integral structure formed by the shielding portion 3 and the main body 1 can be fixed relative to the human head, that is, the adjustment assembly achieves the head-wearing function.

Figure 4:
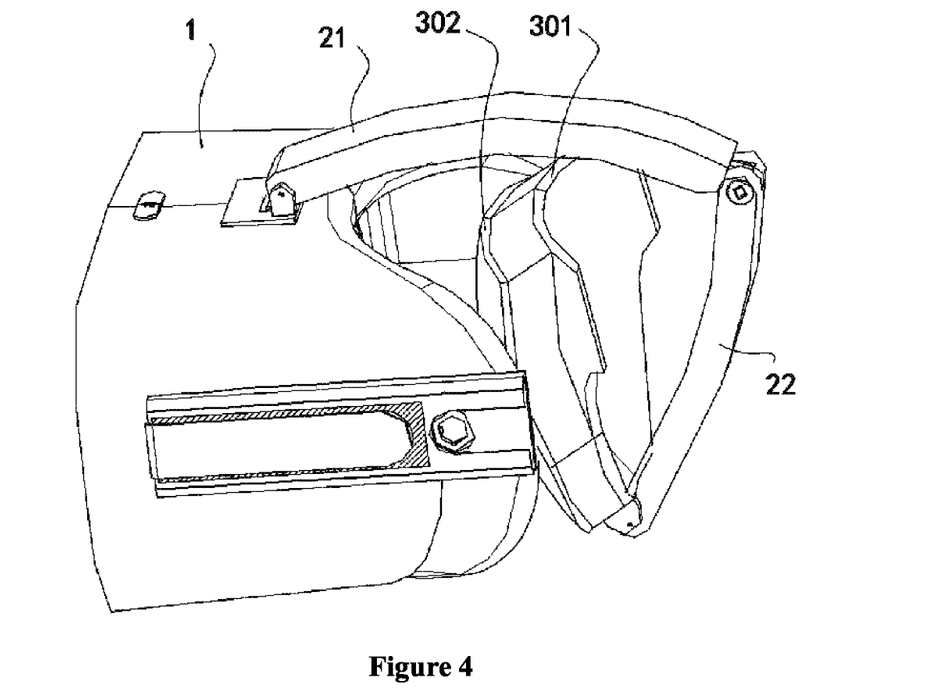
FIG. 4 is a schematic view of a connecting rod group in FIG. 1 when the connecting rod group is in a second working state.
Figure 5:
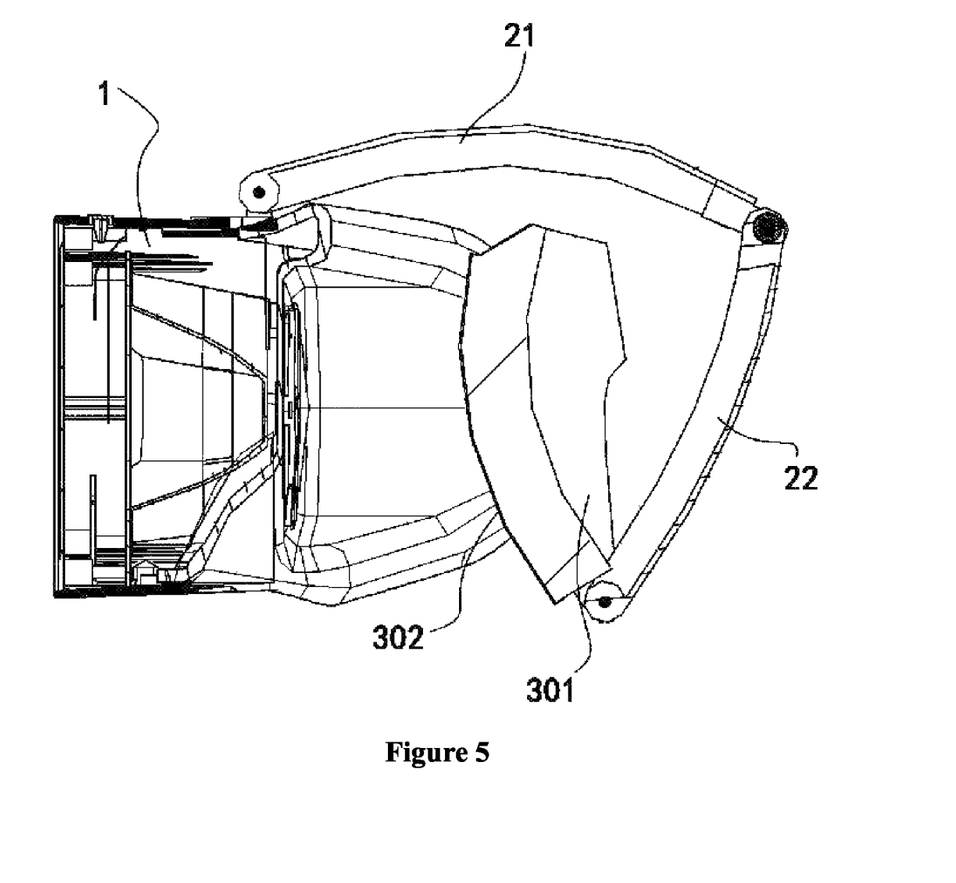
FIG. 5 is a half sectional view of the main body in FIG. 4.

FIGS. 4 and 5 show a situation in which the adjustment assembly is in a second working state. In this case, the adjustment assembly is in a folded state, and the shielding portion 3 is close to the main body 1. That is, when the head-mounted display device is not in use, the shielding portion 3 is close to the main body 1 to block light, thereby preventing the display screen inside the main body 1 from being burned by the light.

Figure 8:
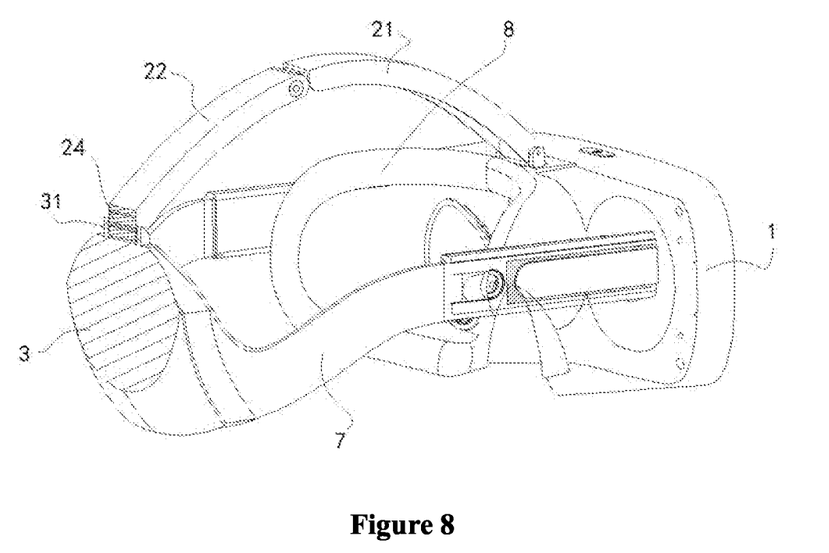
FIG. 8 is a sectional view of a shielding portion in FIG. 1 taken along a longitudinal section.

With respect to the shielding portion 3, the specific shape of the shielding portion should match the shape of the eyepieces or a face-masking portion 8, so that when the adjustment assembly is in the second working state, the shielding portion 3 can completely block the external light and avoid the external light from irradiating the eyepieces and causing burns to the display screen. Referring to FIG. 8, the face-masking portion 8 is provided on the main body 1, and the face-masking portion 8 is located between the main body 1 and the shielding portion 3. During use, the face-masking portion 8 fits the human face so that all the light received by the eyes comes from the display screen inside the main body 1. Since the face-masking portion 8 is located between the main body 1 and the shielding portion 3, the specific shape of the shielding portion 3 should match the shape of the face-masking portion 8. For example, if the face-masking portion 8 has an arc-shaped structure, then the shielding portion 3 should correspondingly be provided with a structure or component that matches the arc-shaped structure of the face-masking portion 8, so that the shielding portion 3 can completely block the external light to prevent light from irradiating into the face-masking portion 8.

If the face-masking portion 8 is detached from the main body 1, the shape of the shield portion 3 should match the shape of the eyepieces to prevent external light from irradiating the eyepieces, which will not be repeated herein again.

With respect to the specific arrangement of the adjustment assembly, the following embodiments are provided according to the present application.

In a first embodiment, the adjustment assembly includes a connecting portion configured to connect the main body 1 with the shielding portion 3. The connecting portion may be a deformable rod. Two ends of the deformable rod are respectively connected to the main body 1 and the shielding portion 3, and the deformable rod can be bent according to actual needs and be kept in a bent state.

For example, the deformable rod may be a member made of ABS, silica gel and spring steel. ABS refers to a terpolymer including three monomers of acrylonitrile (A), butadiene (B) and styrene (S), and the relative content of the three monomers may be changed according to needs to form various resins. The deformable rod is similar to a support post of some desk lamps in the prior art, and the deformable rod is bendable and may be kept in a bent state. Apparently, the deformable rod may be made of materials such as memory alloys in the prior art to realize position change relative to the main body 1, which will not be expanded into details herein.

The connecting portion is not limited to a rod shape, and may have other shapes, as long as the connecting portion is deformable to satisfy the above two functions of the shielding portion 3.

In a second embodiment, the adjustment assembly further includes a connecting rod group 2 configured to connect the main body 1 with the shielding portion 3. The connecting rod group 2 includes at least two connecting rods, and any two adjacent connecting rods are hinged to each other. For example, the connecting rod group 2 includes four connecting rods, which are a first connecting rod, a second connecting rod, a third connecting rod and a fourth connecting rod. The four connecting rods are hinged to each other, the first connecting rod is hinged to the main body 1, and the fourth connecting rod is hinged to the shielding portion 3. The specific arrangement of the connecting rods that are hinged to each other can be realized in any applicable method in the prior art, for example, in a hinged form mentioned below.

The following describes the specific configuration of the connecting rod group 2 which includes three connecting rods.

The connecting rod group 2 between the main body 1 and the shielding portion 3 includes a left connecting rod, a middle connecting rod and a right connecting rod. The left end of the left connecting rod is hinged to the main body 1, the right end of the left connecting rod is hinged to the left end of the middle connecting rod, the right end of the middle connecting rod is hinged to the left end of the right connecting rod, and the right end of the right connecting rod is hinged to the shielding portion 3. With this arrangement, all of the three connecting rods, that is, the left connecting rod, the middle connecting rod and the right connecting rod, are rotatable relative to each other. In a case that the three connecting rods all rotate in a direction of approaching the main body 1, the connecting rod group 2 is in a folded shape, that is, the shielding portion 3 is close to the main body 1, and in this case, the shielding portion 3 is configured to prevent light from irradiating the eyepieces inside the main body 1. In a case that the three connecting rods all rotate in a direction of moving away from the main body 1, the connecting rod group 2 is in a stretched shape, that is, the shielding portion 3 is far away from the main body 1, and in this case, the shielding portion 3 is used to achieve the head-wearing function.

Referring to FIGS. 1 to 5, the connecting rod group 2 may only include a first connecting rod 21 and a second connecting rod 22. A first end of the first connecting rod 21 is hinged to the main body 1, a second end of the first connecting rod 21 is hinged to a first end of the second connecting rod 22, and a second end of the second connecting rod 22 is hinged to the shielding portion 3. While the adjustment assembly is in the first working state, an angle between the first connecting rod 21 and the second connecting rod 22 is relatively large, and the second end of the second connecting rod 22 is far away from the main body 1. By adjusting the angle between the shielding portion 3 and the second connecting rod 22, the shielding portion 3 may be substantially vertical, thereby achieving the head-mounting function.

In a case that the adjustment assembly is in the second working state, the angle between the first connecting rod 21 and the second connecting rod 22 is relatively small, and the second end of the second connecting rod 22 is close to the main body 1. By adjusting the angle between the shielding portion 3 and the second connecting rod 22, the angle between the shielding portion 3 and the second connecting rod 22 may be reduced. In this case, the shielding portion 3 is configured to prevent light from irradiating the eyepieces.

Taking the connecting rod group 2 including the first connecting rod 21 and the second connecting rod 22 as an example, the articulation manner between the connecting rod group 2 and the main body 1 is given below. However, it should be noted that the connection manner between the connecting rod group 2 and the main body 1 is not limited to the articulation manner given below.

As shown in FIG. 2, FIG. 3, FIG. 6 and FIG. 7, the first end of the first connecting rod 21 is provided with a mounting through hole 210, the mounting through hole 210 penetrates through two side walls of the first connecting rod 21, the main body 1 is provided with two lugs 11, the two lugs 11 are located on outer sides of the two side walls of the first connecting rod 21, and the two lugs 11 are provided with position-limiting through holes 110. During the installation process, the first end of the first connecting rod 21 is placed between the two lugs 11 to ensure that the mounting through hole 210 is coaxial with the two position-limiting through holes 110, a first rotating shaft 23 penetrates through the mounting through hole 210 and the two position-limiting through holes 110, and two ends of the first rotating shaft 23 are respectively located in the two position-limiting through holes 110, so as to realize the articulation between the first end of the first connecting rod 21 and the lugs 11, that is, the first end of the first connecting rod 21 is rotatable relative to the main body 1.

With respect to the articulation manner between the second end of the second connecting rod 22 and the shielding portion 3, only one specific arrangement is given below, but the articulation manner between the two is not limited to this.

Figure 2:
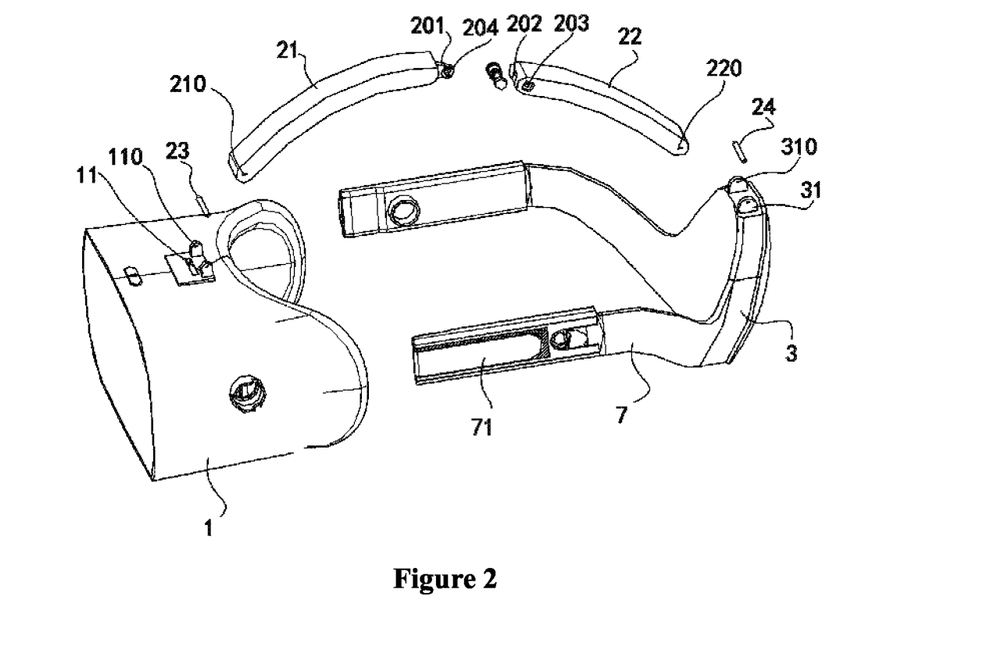
FIG. 2 is an exploded view of the head-mounted display device in FIG. 1.

As shown in FIG. 2 and FIG. 8, the second end of the second connecting rod 22 is provided with an assembly through hole 220, the assembly through hole 220 penetrates through two side walls of the second connecting rod 22, the shielding portion 3 is provided with two lugs 31, the two lugs 31 are located on outer sides of the two side walls of the two connecting rod 22, and the two lugs 31 are provided with position-limiting through holes 310. During the installation process, the second end of the second connecting rod 22 is placed between the two lugs 31 to ensure that the assembly through hole 220 is coaxial with the two position-limiting through holes 310, a second rotating shaft 24 penetrates through the assembly through hole 220 and the two position-limiting through holes 310, and two ends of the second rotating shaft 24 are respectively located in the two position-limiting through holes 310, so as to realize the articulation between the second end of the second connecting rod 22 and the lugs 31, that is, the second end of the second connecting rod 22 is rotatable relative to the shielding portion 3.

Figure 6:
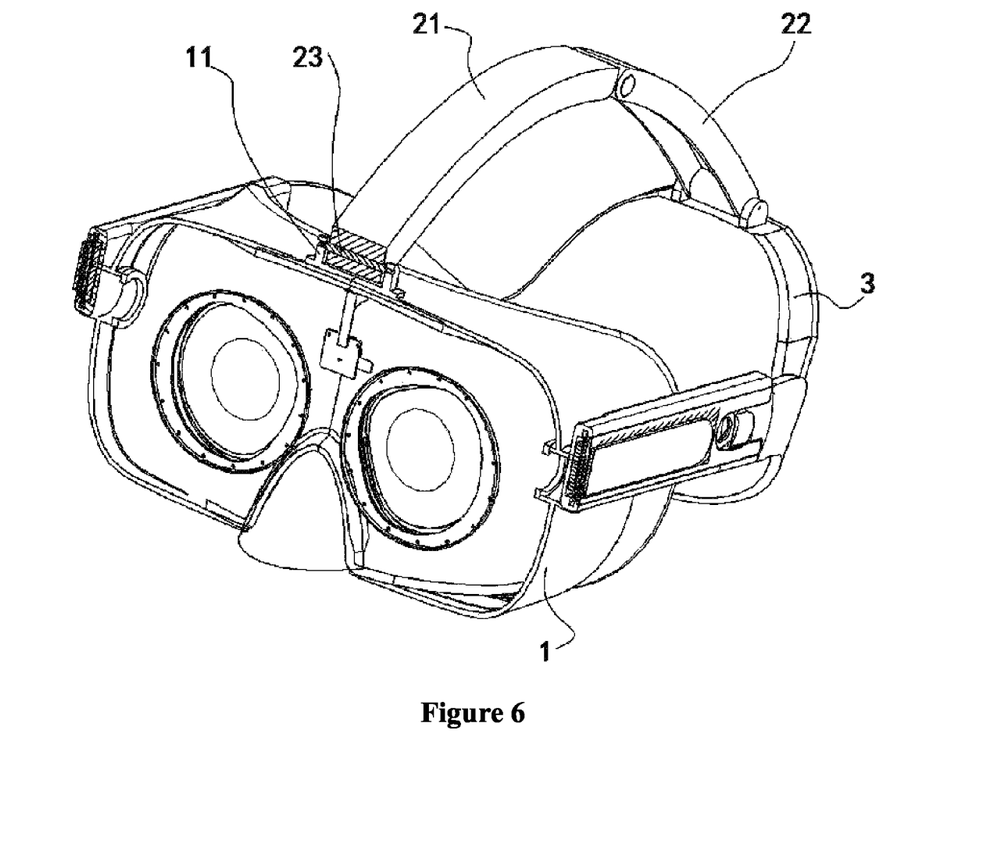
FIG. 6 is a sectional view of the main body in FIG. 1 taken along a longitudinal section.
Figure 7:
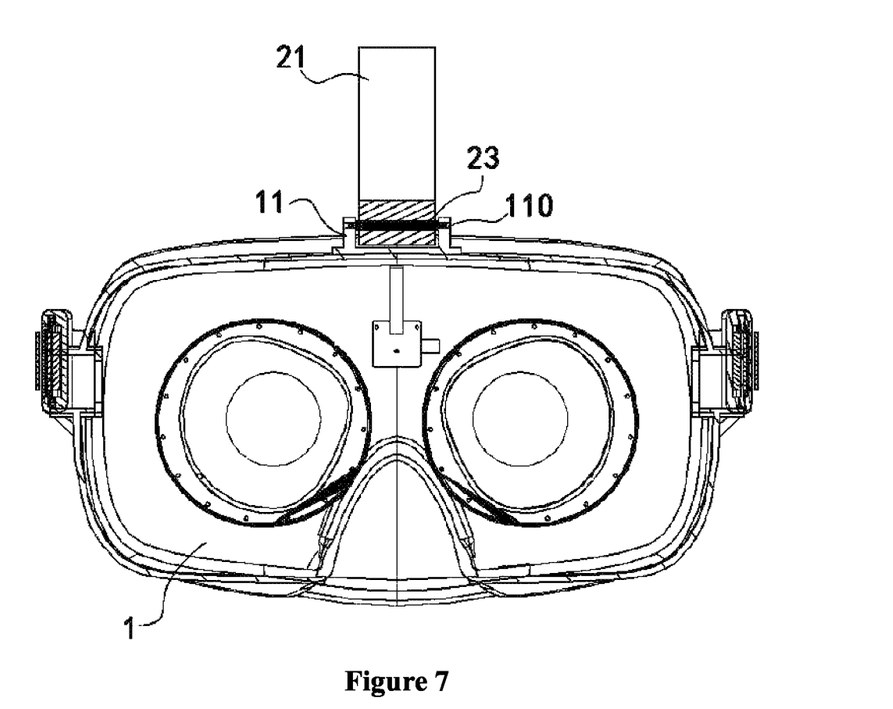
FIG. 7 is a front view of FIG. 6.

As shown in FIG. 1, FIG. 6 and FIG. 8, the first connecting rod 21 and the second connecting rod 22 may both be arc-shaped, and the shielding portion 3 may be arc-shaped as well. In a case that the adjustment assembly is in the first working state, that is, in the case that the second end of the second connecting rod 22 is far away from the main body 1, the included angle between the first connecting rod 21 and the second connecting rod 22 is relatively large, and the first connecting rod 21 and the second connecting rod 22 are arc-shaped for fitting the top of the head. During use, the arc-shaped first connecting rod 21 and second connecting rod 22 are attached to the top of the head, the arc-shaped shielding portion 3 is attached to the back of the head, and the main body 1 is attached to the eyes, so that the head-mounted display device is fixed to the head. Apparently, according to different sizes of the head, the first connecting rod 21 and the second connecting rod 22 may be telescopic rods so as to adjust a distance between the shielding portion 3 and the main body 1.

Figure 3:
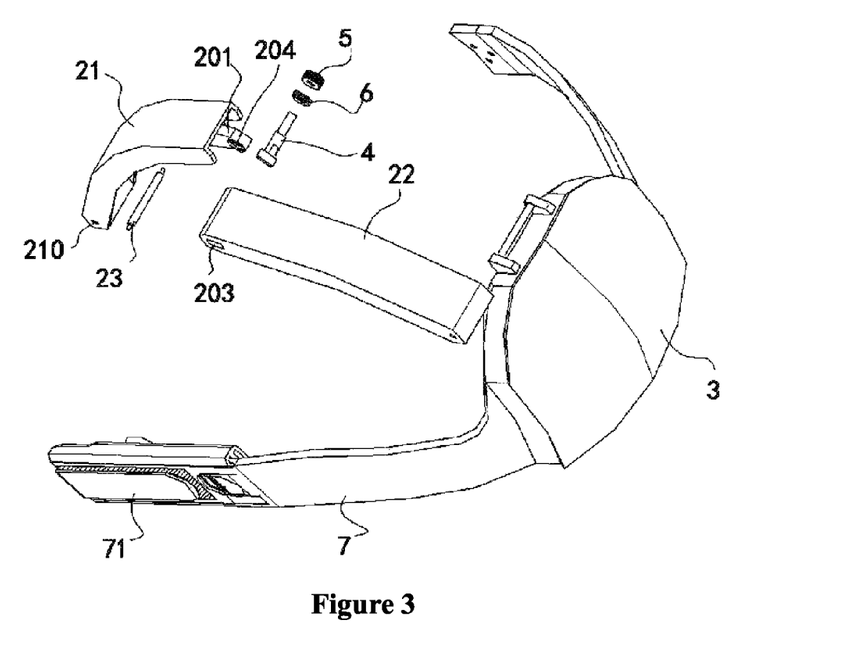
FIG. 3 is a schematic view of FIG. 2 except for a main body, viewed from another angle.

Regarding the articulation manner between the first connecting rod 21 and the second connecting rod 22, FIG. 2 and FIG. 3 are taken as an example for description. Apparently, the articulation manner between the first connecting rod 21 and the second connecting rod 22 may refer to the articulation manner between the first end of the first connecting rod 21 and the main body 1, or refer to the articulation manner between the second end of the second connecting rod 22 and the shielding portion 3. Other articulation manners shall fall within the protection scope of the present application.

The first connecting rod 21 is provided with an extension arm 201, and the second connecting rod 22 is provided with a receiving groove 202. The extension arm 201 extends toward the second connecting rod 22 and is configured to extend into the receiving groove 202. The second connecting rod 22 is further provided with position-limiting holes 203 penetrating through the receiving groove 202. The position-limiting holes 203 penetrate through two side walls of the second connecting rod 22. The extension arm 201 is provided with a through hole 204 penetrating through two sides of the extension arm 201. Apparently, the extension arm 201 may be provided on the second connecting rod 22, and correspondingly, the receiving groove 202 may be provided on the first connecting rod 21, which will not be repeated here.

In order to realize the articulation of the extension arm 201 with respect to the receiving groove 202, a rotating shaft 4 is provided to penetrate through the through hole 204, the receiving groove 202 and the two position-limiting holes 203, and a fastening portion 5 is provided to lock with the rotating shaft 4, so that two ends of the rotating shaft 4 are respectively fixed relative to the two position-limiting holes 203.

Referring to FIG. 3, one end of the rotating shaft 4 is a shaft head, the shaft head is connected with a shaft rod, and a diameter of the shaft head is greater than a diameter of the shaft rod. After passing through one position-limiting hole 203, the shaft rod extends into the receiving groove 202, then the shaft rod passes through the through hole 204 and passes outside through the other position-limiting hole 203, and the diameter of the shaft head is larger than the dimension of the portion of the position-limiting hole 203 which allows the shaft rod to pass through. Therefore, the shaft head is supported tightly in an axial direction, and an end of the shaft rod is locked tightly by the fastening portion 5 to prevent the rotating shaft 4 from axially moving relative to the position-limiting holes 203, that is, the extension arm 201 is located in the receiving groove 202, and the first connecting rod 21 and the second connecting rod 22 are rotatable relative to each other.

Figure 9:
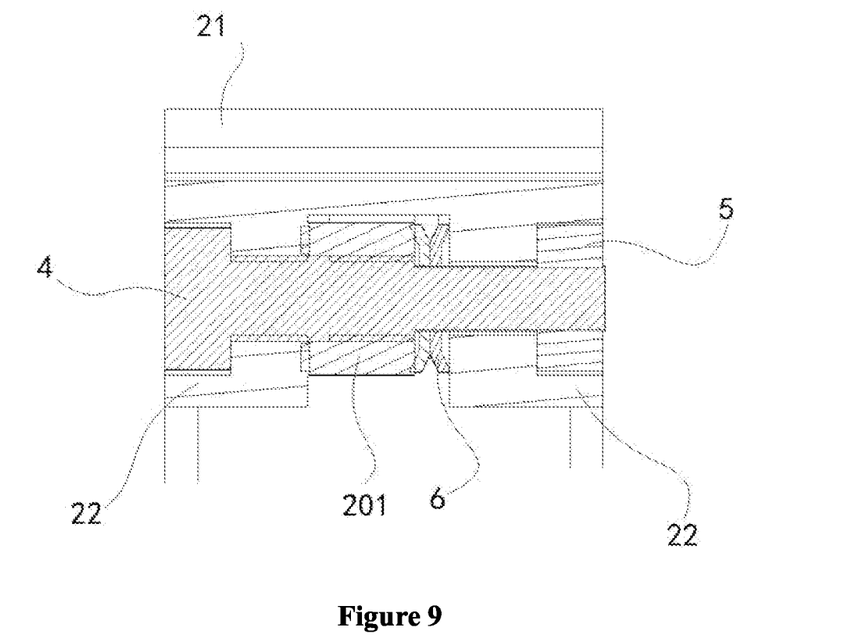
FIG. 9 is a sectional view of a hinge joint between a first connecting rod and a second connecting rod in FIG. 1.

As shown in FIG. 9, the two position-limiting holes 203 of the second connecting rod 22 are stepped holes, and each position-limiting hole 203 has a smaller hole diameter on a side close to the receiving groove 202, and a larger hole diameter on a side far from the receiving groove 202. As mentioned above, the shaft head of the rotating shaft 4 extends into a portion of one position-limiting hole 203 with a larger hole diameter, and the shaft head abuts against the outside of a portion with a smaller hole diameter. The fastening portion 5 extends into a portion of the other position-limiting hole 203 with a larger hole diameter, and abuts against the outside of a portion with a smaller hole diameter.

Figure 10:
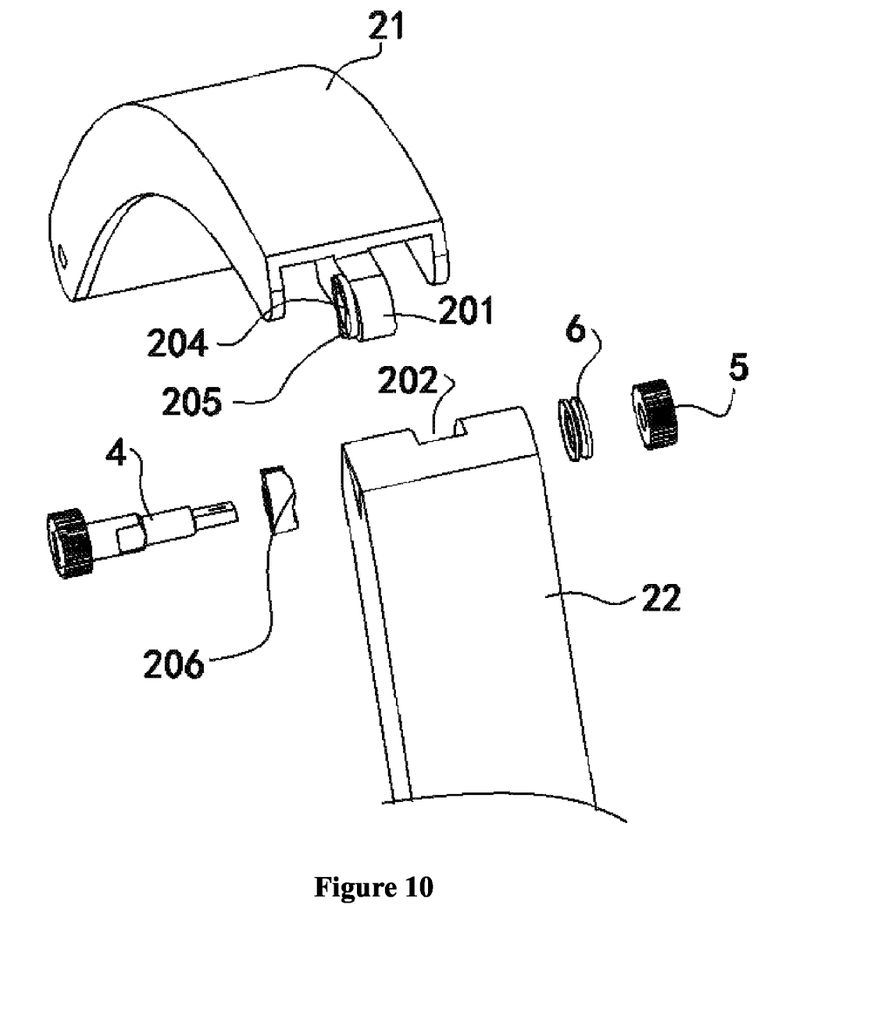
FIG. 10 is an exploded view of the hinge joint between the first connecting rod and the second connecting rod in FIG. 1.

Referring to FIG. 9 and FIG. 10, a damping component 6 is sleeved on the rotating shaft 4, which is elastic in the axial direction of the rotating shaft 4, and the damping component 6 is located in the receiving groove 202. Two sides of the damping component 6 in the axial direction respectively abut against the side wall of the extension arm 201 and the side wall of the receiving groove 202, that is, the damping component 6 is arranged on a side close to the fastening portion 5, as shown in FIG. 9. Apparently, according to actual needs, the damping component 6 may be arranged on a side close to the shaft head, which will not be repeated here. The damping component 6 may be a disc spring, a spring, or the like, which is able to generate a pretension force in the axial direction.

While the first connecting rod 21 rotates relative to the second connecting rod 22, the damping component 6 always has an axial force for pressing against the extension arm 201 and the receiving groove 202. Therefore, there is a certain damping force which hinders the rotation of the first connecting rod 21 relative to the second connecting rod 22 during the rotation of the first connecting rod 21 relative to the second connecting rod 22, and under the action of the axial force, the first connecting rod 21 can be stopped at any position relative to the second connecting rod 22, ensuring that the adjustment assembly can be stationary in the first working state and the second working state. A position-limiting structure may be provided between two fitting side walls of the extension arm 201 and the receiving groove 202, as shown in FIG. 9. The position-limiting structure is arranged on a side close to the shaft head. That is, one side wall of the receiving groove 202 fits one side wall of the extension arm 201 through the position-limiting structure, and another side wall of the receiving groove 202 abuts against another side wall of the extension arm 201 through the damping component 6, so that the extension arm 201 can be prevented from moving axially relative to the receiving groove 202, and the quality of the head-mounted display device can be improved.

Apparently, the above articulation manner between the first connecting rod 21 and the second connecting rod 22 may further be applied to the articulation of the first connecting rod 21 to the main body 1 and the articulation of the second connecting rod 22 to the shielding portion 3. In addition, in a case that the connecting rod group not only includes the first connecting rod 21 and the second connecting rod 22, the articulation manner between the first connecting rod 21 and the second connecting rod 22 may be used between any two adjacent connecting rods, so as to achieve the corresponding technical effect.

For example, the main body 1 is provided with the extension arm 201, and accordingly, the receiving groove 202 is provided at a first end of the first connecting rod 21. Similarly, the extension arm 201 may be provided at the first end of the first connecting rod 21, and the receiving groove 202 is provided at the main body 1, and the remaining parts refer to the above description to achieve the articulation of the main body 1 and the first end of the first connecting rod 21.

Similarly, the extension arm 201 may be provided at the second end of the second connecting rod 22, and accordingly, the shielding portion 3 is provided with the receiving groove 202. Similarly, the extension arm 201 may be provided at the shielding portion 3, and the receiving groove 202 is provided at the second end of the second connecting rod 22, and the remaining parts refer to the above description to achieve the articulation of the second end of the second connecting rod 22 and the shielding portion 3.

Regarding the situation in which the connecting rod group 2 includes the left connecting rod, the middle connecting rod and the right connecting rod, in the articulation manner between the left connecting rod and the middle connecting rod, the right end of the left connecting rod may be provided with the extension arm 201, and accordingly, the left end of the middle connecting rod is provided with the receiving groove 202. Similarly, the right end of the left connecting rod may be provided with the receiving groove 202, and the left end of the middle connecting rod is provided with the extension arm 201, and the remaining parts refer to the above description to achieve the articulation of the right end of the left connecting rod and the left end of the middle connecting rod.

Similarly, the articulation manner between the right end of the middle connecting rod and the left end of the right connecting rod is similar to the above, and will not be repeated here.

That is, the above description only provides one specific implementation for the articulation manner of a case in which two ends of the connecting rod group are respectively hinged to the main body 1 and the shielding portion 3, and the connecting rod group includes at least two connecting rods. However, it should be known to those skilled in the art that the specific articulation manners are not limited to the specific manners given above, and any one of the above articulation manners may be adopted for the articulated parts. Apparently, any other articulation manner in the prior art may be adopted as well, which will not be repeated herein. Referring to FIG. 10, a side wall of the receiving groove 202 is provided with a first position-limiting portion 206, and a side wall of the extension arm 201 is provided with a second position-limiting portion 205. It should be noted that the first position-limiting portion 206 in FIG. 10 should be located on a side wall of the receiving groove 202, and the first position-limiting portion 206 should belong to a part of the receiving groove 202, rather than an independent component. In order to clearly illustrate the shape and structure of the first position-limiting portion 206 and the second position-limiting portion 205, FIG. 10 shows the first position-limiting portion 206 as a component, but it does not mean that the head-mounted display device of the present application has this independent component.

With reference to FIG. 9, the first position-limiting portion 206 and the second position-limiting portion 205 are closely attached to each other, and both have protrusions along the axial direction. The first position-limiting portion 206 and the second position-limiting portion 205 are engaged with each other. When the first connecting rod 21 and the second connecting rod 22 rotate relative to each other, the first position-limiting portion 206 and the second position-limiting portion 205 rotate relative to each other, and the two position-limiting portions are out of the engagement state. When the first connecting rod 21 and the second connecting rod 22 rotate by a certain angle, the first position-limiting portion 206 and the second position-limiting portion 205 are engaged again. In the process of leaving the engagement state until the engagement is achieved again, the user can rotate the first connecting rod 21 and the second connecting rod 22 by a certain angle according to needs, and the relative fixation of the first connecting rod 21 and the second connecting rod 22 is realized under the action of engagement of the first position-limiting portion 206 and the second position-limiting portion 205, that is, it realizes that the extension arm 201 and the receiving groove 202 are kept at the current position after the extension arm and the receiving groove are rotated relative to each other. It can be seen that the above first position-limiting portion 206 and the second position-limiting portion 205 are the position-limiting structure, and the position-limiting structure and the damping component 6 are respectively located on two sides of the receiving groove 202, as shown in FIG. 9. As for the specific arrangement of the position-limiting structure, this application does not make specific limitations, as long as the first position-limiting portion 206 and the second position-limiting portion 205 have complementary features in the axial direction, that is, when the first position-limiting portion 206 and the second position-limiting portion 205 rotate relative to each other, it is only necessary that the two position-limiting portions can be engaged with and separated from each other.

Referring to FIG. 1, the shielding portion 3 includes an inner arc side 301 and an outer arc side 302. When the adjustment assembly is in the first working state, the included angle between the first connecting rod 21 and the second connecting rod 22 is relatively large, the shielding portion 3 is substantially vertical, the inner arc side 301 is close to the main body 1, and the outer arc side 302 is far away from the main body 1. At this time, the inner arc side 301 is configured to fit the head to achieve the head wearing.

Referring to FIG. 4, when the adjustment assembly is in the second working state, after the relative rotation of the first connecting rod 21 and the second connecting rod 22, the connecting rod group 2 is in a folded shape, the included angle between the shielding portion 3 and the second connecting rod 22 is reduced, and the shielding portion 3 rotates to approach the first connecting rod 21. After the rotation of the shielding portion 3, the outer arc side 302 is close to the main body 1, and the inner arc side 301 is far away from the main body 1. The outer arc side 302 shields the outside of the eyepieces to prevent light from irradiating the eyepieces. The outer arc side 302 may further be provided with components such as a protective layer to avoid scratching with the main body 1. The protective layer may specifically be a soft-textured component such as a gauze layer or a sponge layer.

As shown in FIGS. 1 to 3, the head-mounted display device further includes elastic wearing portions 7. One end of each elastic wearing portion 7 is connected to the main body 1, and another end of the elastic wearing portion 7 is connected to the shielding portion 3. The two elastic wearing portions 7 are respectively located on two sides of the main body 1. When the head-mounted display device is in use, the elastic wearing portions 7 can be tightened on two sides of the head to ensure that the main body 1 and the shielding portion 3 respectively abut against eyes and back of the head.

The elastic wearing portion 7 may be an elastic band, a rubber band and the like in the prior art, and the present application does not make specific limitations on this.

Apparently, the main body 1 may further be provided with adjusting devices 71, the elastic wearing portions 7 are connected to the adjusting devices 71, and the adjusting devices can adjust positions of the elastic wearing portions 7 relative to the main body 1, that is, the elastic wearing portions 7 can be adjusted to move close to or away from the main body 1. More specifically, the adjusting device 71 includes a body portion and a sliding rail. The body portion is fixed to the main body 1 and is stationary relative to the main body 1. The sliding rail is arranged on the body portion and is movable relative to the body portion, so as to move away from or close to the main body 1. The sliding rail is connected to the elastic wearing portion 7. When the sliding rail moves away from or close to the main body 1, the elastic wearing portion 7 moves away from or close to the main body 1, so as to adjust the distance between the elastic wearing portion 7 and the main body 1 for adapting to heads of different sizes.

In order to fix the adjusted sliding rail at the current position, the body portion may be provided with a strip groove extending along a moving direction of the sliding rail, and the sliding rail is provided with a locking member for cooperating with the strip groove to fix the sliding rail to the body portion. When the locking member is released relative to the strip groove, the sliding rail is movable relative to the body portion. After the position adjustment of the sliding rail relative to the body portion is finished, the sliding rail is locked to the strip groove by the locking member to achieve a fixed relative position between the body portion and the sliding rail, further adjusting the distance between the elastic wearing portion 7 and the main body 1.

In the head-mounted display device according to the present application, the energy supply component is placed in the shielding portion 3, and the way of placing the energy supply component in the main body 1 in the prior art is abandoned. This arrangement avoids the disadvantage that the main body 1 is too heavy and not suitable for long-term wearing. The energy supply component configured to provide electrical energy to the main body 1 is arranged in the shielding portion 3, so that extreme imbalance of the front and back of the head is avoided when wearing the display device, and the pressure on the head is relieved to a certain extent, and the user experience is further improved.

The energy supply component may be a rechargeable battery, and the energy supply component supplies power to the main body 1 in a wired or wireless manner. If a wired power supply manner is adopted, the energy supply component and the main body 1 can be electrically connected by cables and the like. The cables may be arranged in the connecting rod group 2, and can change according to the shape change of the connecting rod group 2. If a wireless power supply manner is adopted, the energy supply component and the main body 1 may be electrically connected through signals such as pulses, which will not be repeated here.

It should be noted that, terms such as first and second are merely used to distinguish an entity from other entities and do not require or imply that there are any such actual relationships or sequences between these entities herein.

The head-mounted display device according to the present application is described in detail hereinbefore. The principle and the embodiments of the present application are illustrated herein by specific examples. The above description of examples is only intended to help the understanding of the method and spirit of the present application. It should be noted that, for those skilled in the art, many modifications and improvements may be made to the present application without departing from the principle of the present application, and these modifications and improvements are also deemed to fall into the protection scope of the present application defined by the claims.

The technical solution according to the embodiments of the present application has been described in conjunction with the drawings. It is apparent that the described embodiments are only a few rather than all of the embodiments according to the present application. Any other embodiments obtained by those skilled in the art based on the embodiments in the present application without any creative work fall in the protection scope of the present application.

The invention claimed is:

1. A head-mounted display device, comprising: a main body with eyepieces; and an adjustment assembly with a shielding portion, wherein the adjustment assembly is connected to the main body, and the adjustment assembly is configured to adjust a positional relationship between the shielding portion and the main body, the shielding portion comprises an inner arc side and an outer arc side; the outer arc side is far away from the main body, the inner arc side is opposite to the main body, the inner arc side is configured to fit the head to achieve a head-wearing function in a case that the adjustment assembly is in a first working state; and the inner arc side is far away from the main body, the outer arc side is dose to the main body, the outer arc side shields the outside of the eyepieces to prevent light from irradiating the eyepieces in a case that the adjustment assembly is in a second working state.

2. The head-mounted display device according to claim 1, wherein the adjustment assembly further comprises a deformable connecting portion configured to connect the main body with the shielding portion.

3. The head-mounted display device according to claim 2, wherein the shielding portion is provided with an energy supply component configured to provide electric energy to the main body.

4. The head-mounted display device according to claim 1, wherein the adjustment assembly further comprises a connecting rod group configured to connect the main body with the shielding portion.

5. The head-mounted display device according to claim 4, wherein two ends of the connecting rod group are respectively hinged to the main body and the shielding portion, and the connecting rod group comprises at least two connecting rods, and two adjacent connecting rods are hinged to each other.

6. The head-mounted display device according to claim 5, wherein one of mutually articulated two members of the connecting rod group and the main body, of the connecting rod group and the shielding portion, and of the two adjacent connecting rods, is provided with an extension arm, and the other of the mutually articulated two members is provided with a receiving groove configured to receive the extension arm and position-limiting holes penetrating through two sides of the receiving groove;
the extension arm is provided with a through hole penetrating through two sides of the extension arm; and
the head-mounted display device further comprises a rotating shaft configured to penetrate through the through hole and the two position-limiting holes, and a fastening portion is configured to lock with the rotating shaft, and two ends of the rotating shaft are fixed relative to the two position-limiting holes.

7. The head-mounted display device according to claim 6, wherein all the connecting rods are arc-shaped rods; and/or, the shielding portion is arc-shaped.

8. The head-mounted display device according to claim 7, further comprising a damping component sleeved on the rotating shaft and configured to abut against a set of adjacent side walls of the extension arm and the receiving groove.

9. The head-mounted display device according to claim 8, wherein a position-limiting structure is provided between two fitting side walls of the extension arm and the receiving groove, the position-limiting structure and the damping component are respectively located on two sides of the receiving groove, and the position-limiting structure is configured to keep the extension arm and the receiving groove at a current position after the extension arm and the receiving groove are rotated relative to each other.

10. The head-mounted display device according to claim 9, wherein the shielding portion is provided with an energy supply component configured to provide electric energy to the main body.

11. The head-mounted display device according to claim 4, wherein the shielding portion is provided with an energy supply component configured to provide electric energy to the main body.

12. The head-mounted display device according to claim 5, wherein the shielding portion is provided with an energy supply component configured to provide electric energy to the main body.

13. The head-mounted display device according to claim 6, wherein the shielding portion is provided with an energy supply component configured to provide electric energy to the main body.

14. The head-mounted display device according to claim 7, wherein the shielding portion is provided with an energy supply component configured to provide electric energy to the main body.

15. The head-mounted display device according to claim 8, wherein the shielding portion is provided with an energy supply component configured to provide electric energy to the main body.

16. The head-mounted display device according to claim 1, wherein the shielding portion is provided with an energy supply component configured to provide electric energy to the main body.

17. The head-mounted display device according to claim 16, further comprising elastic wearing portions arranged between the main body and the shielding portion and configured to be tightened on two sides of the head of a user.

18. The head-mounted display device according to claim 17, wherein an adjusting device is further provided between the main body and the elastic wearing portion, and the adjusting device is configured to adjust a distance between the elastic wearing portion and the main body.

19. The head-mounted display device according to claim 18, wherein the adjusting device comprises a body portion provided on the main body, and further comprises a sliding rail provided on the body portion and configured to move away from or close to the main body, and the sliding rail is connected with the elastic wearing portion.

* * * * *